United States Patent
Lee et al.

(10) Patent No.: US 6,352,192 B1
(45) Date of Patent: Mar. 5, 2002

(54) SYSTEM AND METHOD TO CONTROL SOLDER REFLOW FURNACE WITH WAFER SURFACE CHARACTERIZATION

(75) Inventors: Tien-Yu Tom Lee, Phoenix; James Vernon Hause, Maricopa; Li Li, Gilbert, all of AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/515,185

(22) Filed: Feb. 29, 2000

(51) Int. Cl.[7] .............................. B23K 1/005; B23K 1/19
(52) U.S. Cl. .................... 228/102; 228/105; 228/262.1; 228/180.1
(58) Field of Search ................................. 228/102, 105, 228/262.1, 180.1

(56) References Cited

U.S. PATENT DOCUMENTS

| | | | | |
|---|---|---|---|---|
| 4,675,826 A | * | 6/1987 | Gentry et al. | |
| 4,690,569 A | * | 9/1987 | Veitch | |
| 4,845,332 A | * | 7/1989 | Jansosek et al. | |
| 5,186,541 A | * | 2/1993 | Paulk | |
| 5,404,224 A | * | 4/1995 | Kotidis et al. | |
| 5,433,368 A | * | 7/1995 | Spigarelli | |
| 5,481,112 A | * | 1/1996 | Marui et al. | |
| 5,490,728 A | * | 2/1996 | Schietinger et al. | |
| 5,573,339 A | * | 11/1996 | Woskov et al. | |
| 5,690,430 A | * | 11/1997 | Rudolph | |
| 5,981,919 A | * | 11/1999 | Masten, Jr. | |
| 6,018,144 A | * | 1/2000 | Vogt et al. | |
| 6,072,150 A | * | 6/2000 | Sheffer | |
| 6,095,681 A | * | 8/2000 | Kunt et al. | |
| 6,110,274 A | * | 8/2000 | Okuno | |

FOREIGN PATENT DOCUMENTS

| | | | | |
|---|---|---|---|---|
| JP | 407018341 A | * | 1/1995 | |
| JP | 408176679 A | * | 7/1996 | |
| JP | 409279252 A | * | 10/1997 | |

* cited by examiner

Primary Examiner—Tom Dunn
Assistant Examiner—Colleen P. Cooke
(74) Attorney, Agent, or Firm—Rennie William Dover

(57) ABSTRACT

A system (5) and method are used for predicting and controlling the temperature of a semiconductor wafer (10) during a solder reflow process by controlling the operating profile of a solder reflow furnace (14). The emissivity of the surface of the wafer (10) is measured using an infrared device (11) prior to the solder reflow process. Using the measured emissivity value of the wafer (10), the peak temperature of the wafer (10) is predicted, and the operating profile of the solder reflow furnace (14) is adjusted accordingly to achieve a desired temperature profile of the wafer (10). A process for reflowing solder on a semiconductor wafer calculates a predicted peak temperature of a semiconductor wafer (10) and controls the actual temperature of the wafer (10) during a solder reflow process by controlling the operating profile of a solder reflow furnace (14).

11 Claims, 1 Drawing Sheet

SYSTEM AND METHOD TO CONTROL SOLDER REFLOW FURNACE WITH WAFER SURFACE CHARACTERIZATION

FIELD OF THE INVENTION

The present invention relates, in general, to a soldering process and a technique for controlling that process. More particularly, the present invention relates to a process for reflowing solder on an article and a method of controlling the operating parameters of a solder reflow furnace for obtaining acceptable soldering of electronic components.

Solder bumps are frequently attached to conductive regions, or solder pads, of a device such as an integrated circuit or a circuit board to allow for surface mounting of the device. If the device is an electronic component, the electronic component may be a semiconductor wafer or package that requires solder ball attachment, such as ball grid arrays (BGA) and chip scale packages (CSP). Pre-formed solder bumps may be automatically positioned on pre-fluxed solder pads using a variety of well-known techniques, including robotic pick-and-placing and stencil methods. Solder bump placement typically is followed by a reflow operation, which secures the solder bumps to the solder pads.

Solder bumps may also be formed from a solder paste, which includes both a solder alloy and a flux, applied to solder pads prior to the reflow operation using commonly known techniques such as screen-printing. As the solder paste is brought through the reflow process, the solder alloy "balls up" and forms a solder bump. In the reflow process, the article containing the pre-formed solder bumps or solder paste is treated in a solder reflow furnace, which generally comprises a conveyor belt running through an oven and passing through several different heating zones. In the hottest zone, the article is treated for only a short period of time, allowing the solder to reach a temperature high enough to cause the solder to melt and reflow. A cool-down cycle completes the reflow process.

In an exemplary process, a rapid thermal, radiation-heated furnace is used to reflow solder bumps on silicon wafers. The solder bumps may be made from either lead (Pb)/tin (Sn) solders or Pb-free solders. In order to achieve uniform solder bump formation, an optimal solder reflow furnace operating profile (comprising a combination of furnace zone temperatures and belt speed operating parameters) must be predetermined for each wafer type. Due to the difference in wafer surface characteristics, the wafer temperature profile during reflow, including the maximum temperature achieved by the wafer during the solder reflow process (referred to as the peak temperature), cannot easily be controlled. This can result in poor solder bump formation and low reliability of the assembled package. A controllable wafer temperature profile results in a controllable solder reflow bump formation, which improves die and assembled package reliability. To select an appropriate furnace operating profile, a functional or test wafer has often been used to measure the wafer peak temperature, time above the solid-liquidus stage, and wafer ramp and cooling rates in the solder reflow furnace. By matching the required wafer reflow specifications, an optimal furnace operating profile could be determined.

Unfortunately, running functional or test wafers to determine furnace operating profiles for each wafer type can be expensive and time-consuming. Further, this calibration process has the possibility of damaging functional wafers.

In view of the above, a need exists in the field of the present technology for more quickly and efficiently determining suitable operating parameters for configuring a furnace operating profile such that the solder reflow process for electronic components or other articles is optimized.

DETAILED DESCRIPTION OF THE DRAWINGS

Generally, the present invention provides a process for reflowing solder on an article and a method of controlling the operating parameters of a solder reflow furnace to obtain acceptable soldering of articles, such as electronic components.

With the problems of the prior art in minds it is therefore proposed to predict article peak temperature prior to the reflow process to reduce the number of process steps required in determining reflow profiles to optimize a process for reflowing solder.

In a solder reflow furnace, the energy absorbed by an article being processed is generated by the heat sources located in the interior of the furnace. The higher the emissivity of the article, the higher peak temperature it will experience. The surface characteristics of an article affect its emissivity. By measuring an article's emissivity prior to the reflow process, a mathematical correlation can be obtained between the article's emissivity and its peak temperature during reflow.

An innovative approach is therefore proposed to effectively predict and control article peak temperature during the solder reflow process by controlling the operating parameters of a solder reflow furnace. In accordance with one embodiment of the invention, this approach measures the article's surface emissivity value prior to the reflow process and uses the measured emissivity value to predict the peak temperature of the article, and thus reduce cycle time for optimizing solder reflow furnace operating parameters. Further, this approach utilizes article surface emissivity values and article peak temperature predictions to adjust and control solder reflow furnace operating parameters to achieve a desired article peak temperature.

Figure 1:
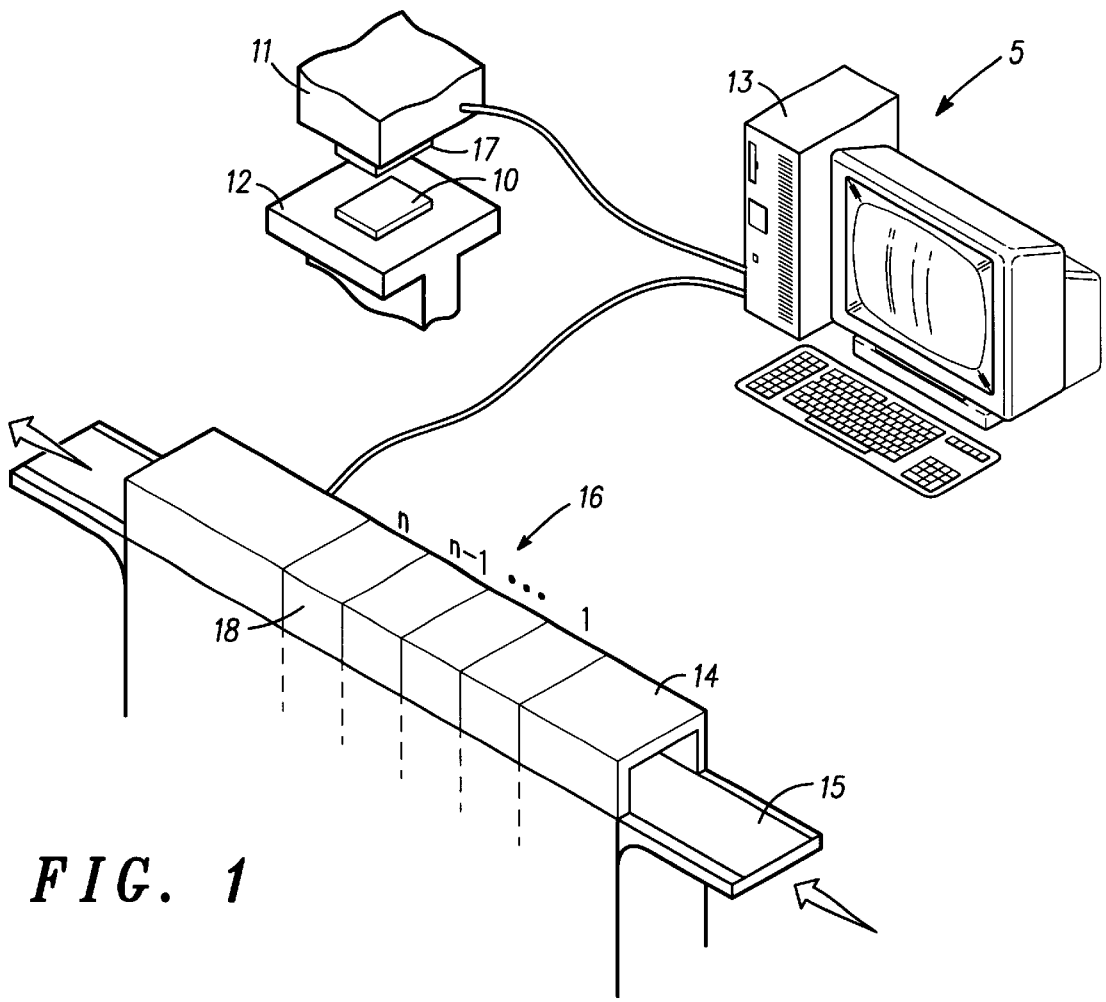
FIG. 1 illustrates a system for predicting and controlling the peak temperature of an article during the solder reflow process by controlling the operating parameters of a solder reflow furnace in accordance with an embodiment of the present invention.

FIG. 1 illustrates a system 5 in accordance with one embodiment of the invention for predicting and controlling the peak temperature of an article 10 during the solder reflow process by controlling the operating parameters of a solder reflow furnace 14. As those skilled in the art are aware, the energy absorbed by an article passing through a solder reflow furnace comes from the heat sources in the interior of the solder reflow furnace. If the article exibits high absorptivity, it will absorb more energy from the radiant sources and will experience a higher surface temperature than an article with a lower absorptivity. From Kirchhoff's Law, the absorptivity of a material equals the emissivity of the material. Thus, all other conditions being equal, an article 10 with a high emissivity value passing through solder reflow furnace 14 will experience a higher surface temperature than will an article with a low emissivity value. The surface characteristics of article 10 affect its emissivity. Such characteristics include metal patterns, passivation structures, and the like. By measuring or estimating an article's emissivity prior to processing in a solder reflow furnace, a mathematical correlation can be obtained between the article's emissivity value and the article's peak temperature during reflow.

Solder reflow furnace 14 generally includes a convection or radiation heated chamber 18. A conveyor belt 15 is configured to transport articles through the chamber during the solder reflow process. Preferably, solder reflow furnace 14 includes a plurality of heat sources 16 that comprise different temperature "zones" in the solder reflow furnace. In a preferred embodiment, the operating temperature of each zone can be adjusted independently of the other zones such that a desired solder reflow furnace temperature profile may be achieved.

In accordance with the present invention, article 10 may comprise any article requiring solder reflow processing. For example, the article may be an electronic component or any silicon wafer or flip-chip bumped package that requires solder ball attachment, such as ball grid arrays (BGA), chip scale packages (CSP), and direct chip attachment (DCA) packages. For purposes of illustration only, and without limitation, the invention will be illustrated with particular reference to its application to reflowing solder bumps on a semiconductor wafer.

Semiconductor wafers of the same size, but exhibiting different surface patterns, surface characteristics, and/or functionalities, will exhibit different peak temperatures under identical solder reflow furnace 14 operating profiles. Thus, the emissivity value of wafer 10 measured in accordance with an embodiment of the present invention will correlate with the peak temperature of only those wafers exhibiting the identical (or nearly identical) surface characteristics as the measured wafer, such as wafers manufactured from the same lot. The surface characteristic of a semiconductor wafer may include metal patterns, passivation structures, and the like.

System 5 further comprises an infrared (IR) device 11 for measuring the emissivity of wafer 10. IR device 11 can be an infrared microscope system, and IR camera, or any other means known to those skilled in the art for measuring the emissivity of the wafer.

IR device 11 calculates the emissivity value of wafer 10 using a combination of preset temperature data and measured radiation data. Preset temperature data represents the temperature of wafer 10 at the time radiation data is gathered. In a preferred embodiment, the preset temperature data is equal to the temperature of a hotplate 12 upon which wafer 10 is heated. IR device 11 may also comprise a lens 17 for receiving radiation from the surface of wafer 10, thereby capturing the infrared image of wafer 10. The data received by lens 17 is recorded within IR device 11. Using the preset temperature data and the recorded radiation data, IR device 11 calculates an estimated emissivity value associated with the surface of wafer 10. Preferably, IR device 11 is an IR camera or an IR microscope system with automatic emissivity capitalization capability. Thus, by inputting a known temperature to the IR microscope system, the system will calculate the emissivity values of the corresponding infrared image based on the given temperature. Such a system is, for example, a long-wave (8–12 millimeter) infrared microscope system, Agema 900 model, made by FLIR Systems.

It is preferred that lens 17 be of suitable diameter to receive radiation from as much of the surface of the wafer as possible in measuring the emissivity value, such that an average emissivity value for the entire surface of the wafer may be obtained. IR device 11 may also be adapted to measure the emissivity value of a plurality of smaller areas on the surface of wafer 10, so that the average of these independent measurements may be used to determine the average emissivity of the surface of the wafer. If the surface characteristic that affects the emissivity of wafer 10 is, for example, a uniformly repeated pattern, it also may be possible to measure the emissivity of only one point or a small area on the surface of the wafer and use this value to determine, e.g., using extrapolation techniques, the emissivity value of the entire surface of wafer 10.

In a preferred embodiment, wafer 10 is heated to a predetermined temperature. The wafer can be heated, for example, by placing it on a hotplate 12 or other heating apparatus. In a preferred embodiment, hotplate 12 is heated to a predetermined temperature that approximates the solder reflow temperature of wafer 10. For example, a commonly used lead (Pb)/tin (Sn) solder containing 63 weight percent Sn has a liquidus temperature of approximately 183 degrees Celsius (° C.) and a eutectic solder reflow temperature of approximately 200° C. Accordingly, a wafer upon which this solder is to be reflowed would be heated to a predetermined temperature of approximately 200° C. in accordance with a preferred embodiment of the present invention. After wafer 10 reaches a steady-state (i.e., equilibrium) temperature approximately equal to the temperature of hotplate 12, the infrared image of the surface of wafer 10 is recorded by IR device 11. Using the value of the steady-state temperature 10 and the measured radiation from the surface of wafer 10, IR device 11 calculates a value of the equivalent surface emissivity of wafer 10.

If wafer 10 is a silicon wafer, wafer 10 may be semi-transparent in the infrared wavelength range. The measured radiation, and thus the calculated emissivity of the wafer, are functions of both the metallization structures on the wafer and the surface characteristics of hotplate 12. As a result, the surface characteristics of the hotplate can affect the emissivity value calculation because the IR device receives radiation emitted from both the hotplate and the wafer. It should be noted the surface of hotplate 12 may be at least partially "visible" to lens 17 through wafer 10 when the emissivity of wafer 10 is measured. Various surfaces associated with hotplate 12 are known in the art, including aluminum, copper, and copper with black paint. In a preferred embodiment, a copper hotplate having a black surface coating (e.g., black paint) gives repeatable and stable emissivity values and is resistant to environmental variations. A suitable black paint may comprise barbecue flat black, which is suitable to withstand very high temperatures, and which enables consistent and accurate emissivity measurements for semi-transparent articles.

In a preferred embodiment of the present invention, the emissivity value of wafer 10 obtained from IR device 11 is input to a computer 13 equipped with any suitable computer software capable of effecting a mathematical correlation between the emissivity value and the peak temperature of wafer 10. A digital emissivity value output from IR device 11 may be transmitted directly to computer 13; alternatively, an analog emissivity value output may be manually entered into computer 13.

A mathematical correlation between the measured emissivity value and the predicted peak temperature of wafer 10 can be derived for a variety of article types and solder compositions. Preferably, this mathematical correlation is a linear equation of the form:

$$\text{Peak Temperature} = (\text{Emissivity Value}) * x + b,$$

where x and b are coefficients that are determined experimentally and that vary according to the type of solder alloy used on the surface of the wafer.

From the predetermined mathematical correlation between the emissivity value and the peak temperature of wafer 10, computer 13 generates a predicted peak temperature of wafer 10 from the emissivity value input provided by IR device 11. If the predicted peak temperature of wafer 10 differs from the desired peak temperature of wafer 10 during the solder reflow process, the operating parameters of solder reflow furnace 14 may be adjusted. For example, if the predicted peak temperature of wafer 10 exceeds a desired maximum peak temperature, the furnace zone temperatures of solder reflow furnace 14 may be adjusted downward and/or the speed of conveyor belt 15, which transports wafers through solder reflow furnace 14, may be increased accordingly to ensure a desired peak temperature of wafer 10. In a preferred embodiment, computer 13 is coupled to solder reflow furnace 14 such that computer 13 automatically adjusts at least one of the operating parameters of solder reflow furnace 14 using the predicted peak temperature such that a desired peak temperature of wafer 10 is achieved.

Figure 2:
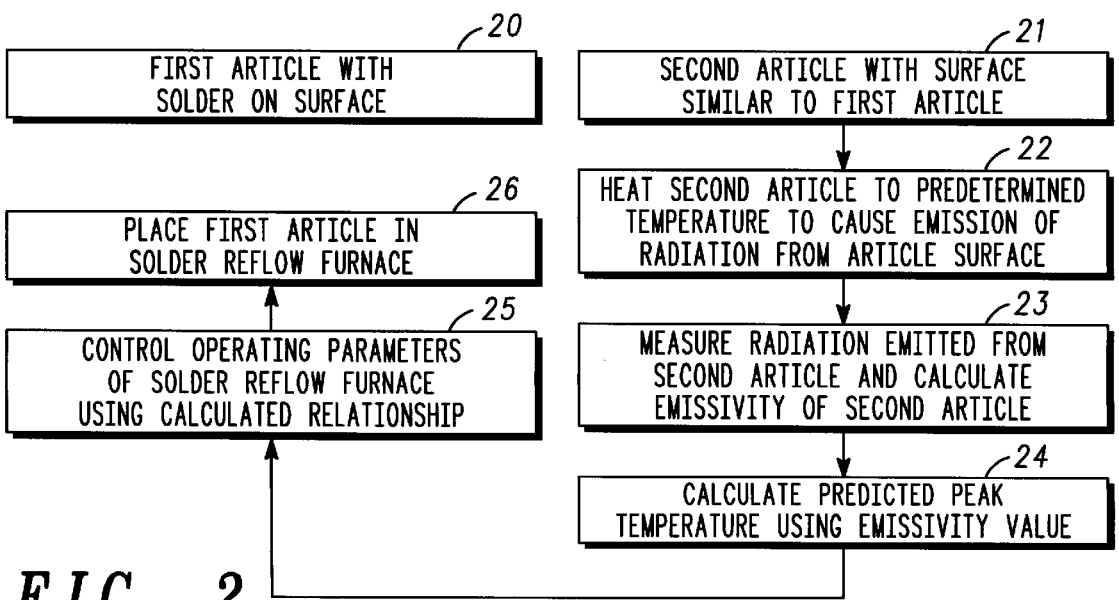
FIG. 2 is a flowchart illustrating a process for reflowing solder on an electronic component in accordance with an embodiment of the present invention.

FIG. 2 illustrates, in flowchart form, a process for reflowing solder on a semiconductor wafer in accordance with a preferred embodiment of the present invention. In step 20, a wafer is provided having solder on its surface. This is a "real" wafer; that is, it is a functional wafer upon which a solder reflow process is to be carried out. The real wafer may be, for example, one wafer out of a large production run. In step 21, a second "test" wafer is provided having a material composition and surface characteristic similar to the real wafer of step 20. The test wafer may or may not have solder on its surface, but is otherwise identical or nearly identical to the real wafer. Preferably, the real wafer and the test wafer were manufactured from the same lot.

In step 22, the test wafer is heated to a predetermined temperature through any suitable means known to those skilled in the art, for example, by a hotplate such as hotplate 12 in FIG. 1. Heating step 22 causes emission of radiation from the test wafer. After heating the test wafer, for example, after the test wafer has reached a steady-state (i.e., equilibrium) temperature, the radiation emitted from the test wafer is measured in step 23 and an emissivity value for the test wafer is calculated as a function of the measured radiation. Measuring and calculating step 23 is preferably performed by, for example, an infrared device such as IR device 11 in FIG. 1. In step 24, a predicted peak temperature of the test wafer is calculated, inter alia, the measured emissivity value using a mathematical correlation between wafer surface emissivity and peak temperature.

In step 25, if the predicted peak temperature from step 24 of the test wafer differs from the desired peak temperature of the real wafer during the solder reflow process, the operating parameters (including, for example, furnace zone temperatures and conveyor belt speed) of the solder reflow furnace may be adjusted. For example, if the predicted peak temperature of the test wafer exceeds a desired maximum peak temperature, the furnace zone temperatures of the solder reflow furnace may be adjusted downward, the speed of the conveyor belt, which transports articles through the solder reflow furnace, may be increased, or a combination of furnace zone temperature and conveyor belt speed adjustments may be made to ensure a desired peak temperature of the real wafer. The desired peak temperature of the real wafer is a predetermined temperature that enables effective solder reflow, yet maintains the quality and functional integrity of the wafer. In step 26, the real wafer is placed on the conveyor belt of a solder reflow furnace to begin reflow processing.

The following example is provided for the purpose of further illustrating several aspects of the above-described embodiment of the present invention, and is not intended to limit the scope of the claimed invention in any way.

EXAMPLE 1

Four semiconductor wafers having various surface characteristics were selected for the purpose of determining an empirical relationship between the surface emissivity of a semiconductor wafer and its peak temperature during solder reflow processing: a 6" sensor array wafer; a 6" stenciled wafer; an 8" sensor array wafer; and a 5" microcontroller (MCU) functional wafer. The sensor array wafers were precalibrated test wafers in which thermocouples were embedded inside the wafer for temperature measurement. First, the surface emissivity of each of the four wafers was measured using a long-wave (8–12 $\mu$m) infrared microscope system. Each wafer was placed on a copper hotplate coated with flat black paint, which was heated to approximately 200° C. Each wafer was allowed to reach a steady-state temperature of approximately 200° C., after which the infrared image of the wafer surface was recorded using the infrared microscope system. Once the surface emissivities of the various wafers were measured, the wafers were processed in a rapid thermal, radiation-heated solder reflow furnace having five temperature zones. In this process, the five-zone reflow temperatures were set at 120° C., 145° C., 205° C., 220° C., and 390° C. The speed of the conveyor belt passing through the furnace was set at 14 inches per minute (ipm). A solidus-liquidus temperature of 183° C. was used as a baseline for measuring the amount of time the wafer temperature remained above the solidus-liquidus temperature, based on the eutectic solder typically used. The test results are set forth in Table 1.

TABLE 1

| Wafer Type | Emissivity Value | Wafer Peak Temperature |
| --- | --- | --- |
| 6" sensor array wafer | 0.596 | 209° C. |
| 6" stenciled test wafer | 0.638 | 225° C. |
| 8" sensor array wafer | 0.719 | 238° C. |
| 5" MCU functional wafer | 0.756 | 249° C. |

From the data in Table 1, a linear equation was derived between wafer surface emissivity and peak temperature:

$$\text{Peak Temperature} = a^*(\text{Emissivity}) + b$$

where the coefficient a is approximately 261.522 and the coefficient b is approximately 51.516. The coefficients of the resulting equation are unique to the eutectic solder system chosen; however, coefficients of the equation may be determined by the same experimental method for use with wafers with other solder systems, for example, high-lead solder and lead-free solder systems.

While specific embodiments of the present invention have been shown and described, further modifications and improvements will occur to those skilled in the art. It is understood that the invention is not limited to the particular forms shown and it is intended for the appended claims to cover all modifications which do not depart from the spirit and scope of this invention.

What is claimed is:

1. A method for controlling a desired peak temperature of a solder reflow furnace, comprising:

measuring an emissivity value of a first article from a manufacturing lot of articles prior to reflow of said articles; and adjusting at least one of a set of operating parameters of a solder reflow furnace, using said emissivity value, to achieve a desired peak temperature for said article of said manufacturing lot.

2. The method of claim 1, further comprising predicting a peak temperature of said articles as a function of said emissivity value.

3. The method of claim 1, wherein measuring the emissivity value of the surface of said first article comprises measuring an emissivity value of a surface of a silicon wafer.

4. The method of claim 1, wherein the step of adjusting at least one of a set of operating parameters of the solder reflow furnace comprises adjusting at least one of a group consisting of furnace zone temperatures and conveyor belt speed.

5. The method of claim 1, wherein measuring the emissivity value comprises:

heating said first article to a predetermined temperature; and measuring radiation emitted from a surface of said first article using an infrared device.

6. The method of claim 5, wherein measuring radiation emitted from the surface of said first article comprises measuring radiation using an infrared device selected from the group consisting of an infrared microscope system and an infrared camera.

7. The method of claim 5, wherein heating said article comprises heating said article on a hotplate, said hotplate having a surface comprising at least one of aluminum, copper, and copper coated with black paint.

8. A method for controlling a solder reflow furnace comprising:

predicting a peak temperature of an article using the emissivity value of a surface of said article; and adjusting at least one of a set of operating parameters of a solder reflow furnace in accordance with said predicted peak temperature.

9. The method of claim 8, wherein predicting the peak temperature of said article comprises using a mathematical relationship between said emissivity value and said peak temperature to calculate said predicted peak temperature.

10. The method of claim 8, wherein adjusting said operating parameters comprises coupling a computer to said solder reflow furnace such that said computer adjusts at least one of said operating parameters of said solder reflow furnace using said predicted peak temperature such that a desired peak temperature of said article is achieved.

11. The method of claim 8, wherein said operating parameters are selected from the group consisting of furnace zone temperatures, conveyor belt speed, and combinations thereof.

* * * * *